April 21, 1970   A. K. KAYSER   3,507,119
OSCILLATING ROTOR JET ENGINE
Filed Oct. 24, 1968   4 Sheets-Sheet 1

INVENTOR.
ALFRED K. KAYSER
BY
Arne T. Fors
Agent

INVENTOR.

BY ALFRED K. KAYSER.

Agent

INVENTOR.
BY ALFRED K. KAYSER.

United States Patent Office 3,507,119
Patented Apr. 21, 1970

3,507,119
OSCILLATING ROTOR JET ENGINE
Alfred Karl Kayser, 2 Armada Court,
Scarborough, Ontario, Canada
Continuation-in-part of application Ser. No. 690,817,
Dec. 15, 1967. This application Oct. 24, 1968, Ser.
No. 798,515
Int. Cl. F02b 53/08; F02k 7/02
U.S. Cl. 60—247    8 Claims

ABSTRACT OF THE DISCLOSURE

An engine having a rotor mounted for oscillation on a shaft within a casing. Oscillation of the rotor produces large quantities of exhaust gases at high pressure to provide a jet-like thrust. Apertures are provided through the casing for the flow of fuel and air and the rotor interrupts the flow when blocking the apertures thereby controlling the flow in timed relation with the oscillation of the rotor. After the engine has completed a small number of cycles the electrical ignition system may be shut down and combustion will be carried within a groove provided in the end wall of the casing.

In the second embodiment, the engine has a pair of rotors mounted on parallel shafts within a casing. Fastened to shafts are gears which mate with each other to synchronize the rotors.

This application is a continuation-in-part of application Ser. No. 690,817, filed Dec. 15, 1967, now abandoned.

This invention relates to jet engines and is particularly directed to engines having a single oscillating rotor or a pair of oscillating rotors producing power output in the form of jet propulsion.

Internal combustion engines are known having one or a pair of parallel shafts, each to which a rotor is attached. Each shaft is positioned in an arcuate chamber and by appropriate timing of the entry of fuel and air into the chamber, and by correct ignition sequence, the rotor is caused to oscillate. Where a pair of rotors are mounted to a pair of parallel shafts, the rotors oscillate in opposite angular directions with respect to each other. The power output of such engines is in the form of cyclical rotation of an output shaft.

Since output from such engines is normally transmitted to at least one output shaft by an arrangement of driver and driven gears, the shaft or shafts, rotors, gears and output shafts have a substantial mass. The inertia when a shaft is in motion is considerable and substantially inhibits the rapid change in angular velocity of the rotor attached thereto. In addition, such an engine employs a large number of moving parts and demands careful lubrication to ensure efficient operation.

A further problem is that such an engine requires a relatively sophisticated ignition system and also requires a valving system independent of the rotors.

It is accordingly an object of the present invention to provide an engine having a rotor of relatively little mass which is capable of oscillating at a very high rate.

It is another object to provide an engine which is light and inexpensive of construction and in which there is a very small number of moving parts.

It is another object to provide an engine which expels large amounts of exhaust gases at high pressure to provide a jet-like thrust.

It is another object to provide an engine in which the electrical ignition system may be shut down after a small number of cycles and in which the rotor acts as a valve to control the entry of fuel and air into the combustion zones.

According to the present invention, power output in the form of jet propulsion may be obtained from an engine having few moving parts by providing, in combination a casing having end walls, a rotor defining with the interior surfaces of the casing two combustion zones, the rotor mounted for oscillation within the casing and being in sealing sliding engagement with the interior surfaces of the casing, means for controlling the flow of fuel and air into the combustion zones in timed relationship with the oscillation of the rotor, means for igniting the fuel and air within the combustion zones and at least one exhaust port from the combustion zone producing power output in the form of jet propulsion.

In a narrow aspect of the present invention, an engine is provided composed of a casing having end walls, a pair of rotors defining with the interior surfaces of the casing two combustion zones, the rotors mounted for oscillation within the casing and being in sealing sliding engagement with the interior surfaces of the casing, means for synchronizing the rotors to oscillate in opposite angular directions with respect to each other, means for controlling the flow of fuel and air into the combustion zone in timed relationship with the oscillation of the rotors, means for igniting the fuel and air within the combustion zone and at least one exhaust duct from a combustion zone producing power output in the form of jet propulsion.

A feature of this engine is that the rotor operates as a valve for controlling the passage of fuel and air into the engine. In addition, means are provided to allow combustion to spread from one combustion zone to the other after the engine has completed a small number of cycles, thereby permitting the electrical ignition system to be shut down.

A fuller understanding of the invention may be had by referring to the following description and claims taken in conjunction with the accompanying drawings in which:

Like reference characters refer to like parts throughout the description of the drawings.

Figure 1:
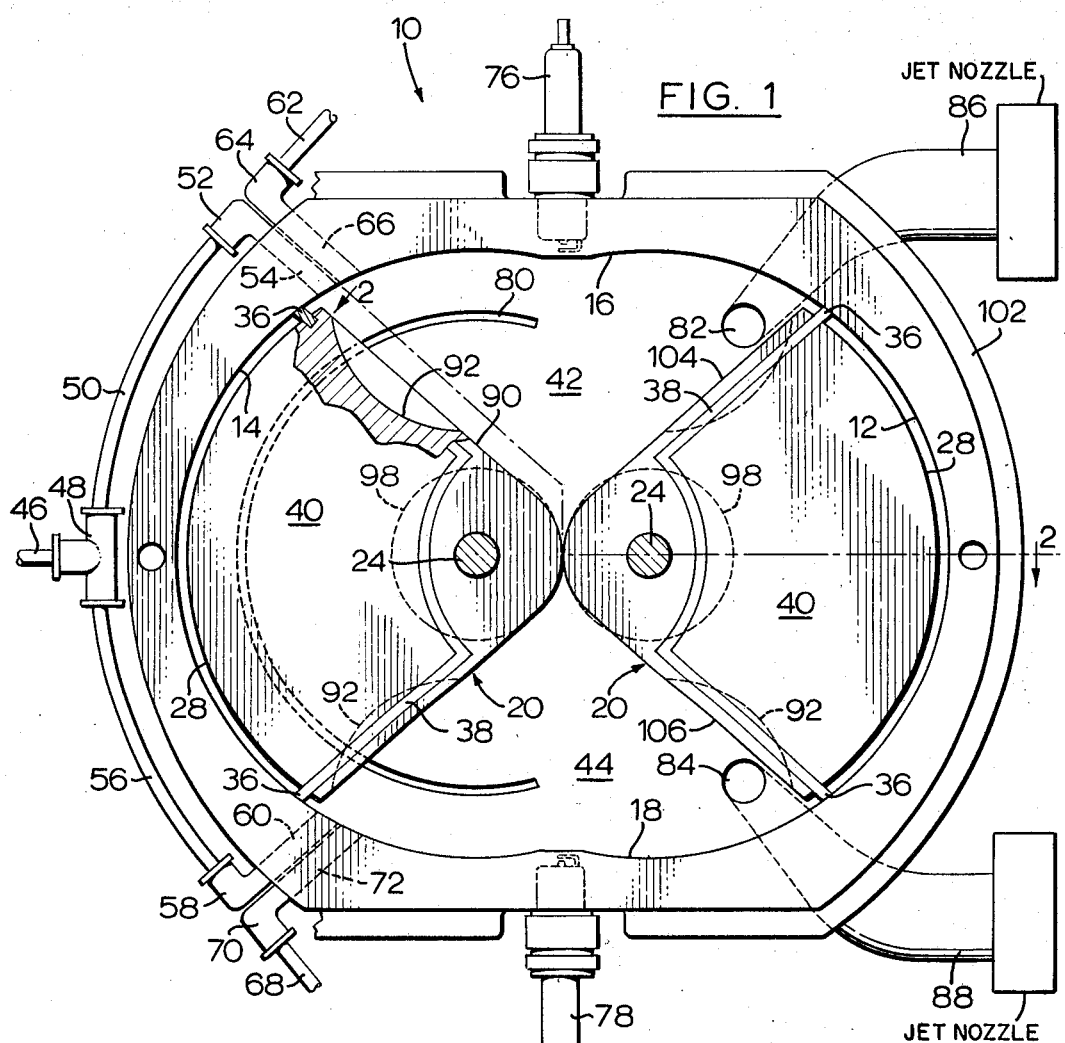
FIGURE 1 is an elevation of one embodiment of the engine according to the invention in which an end wall is removed to expose the interior of the engine.

With reference to FIGURE 1, the engine illustrated consists of a casing generally designated as 10 having side walls 12 and 14 and upper and lower walls 16 and 18 respectively. Mounted within casing 10 are rotors 20. Each rotor 20 is attached to a shaft 24 and has an arcuate surface 28 in proximity to adjacent interior surfaces of side walls 12 or 14. The distance between surface 28 and adjacent interior surfaces of side walls 12 or 14 is no greater than necessary to permit free oscillation of rotor 20, the preferred distance being less than 0.1 millimetre. The curvature of surface 28 is the same as that of the interior surfaces of side walls 12 and 14 so that as rotor 20 oscillates, the distance between surface 28 and adjacent interior surfaces of side walls 12 and 14 remains substantially the same. A pressure type seal is maintained between each surface 28 and adjacent interior surfaces of side walls 12 and 14 and between each face 40 of rotor 20 and adjacent interior surfaces of end walls 32 and 34 (shown in FIGURE 2). As shown in FIGURE 1, elongated seal 36 mortised to rotors 20 acts as a seal between surface 28 and adjacent interior surfaces of side walls 12 or 14. That portion of seal 36 within surface 28 is disposed parallel to shaft 24 and in firm abutting engagement with adjacent interior surfaces of side walls 12 or 14. The remaining portions of seal 38 are embedded in faces 40 of rotor 20 and are in firm abutment with the interior surfaces of end walls 32 and 34 for sealing engagement therewith. Seal 36 may be of hardened steel and spring loaded in rotor 20.

Fuel is fed to zone 42 in casing 10 by pipe 46, T-connection 48, arcuate pipe 50, elbow inlet nozzle 52 and through bore 54. Similarly, fuel is fed to zone 44 by a pipe 46, T-connection 48, arcuate pipe 56, elbow inlet nozzle 58 and through bore 60. Air is fed through pipe 62, elbow 64, bore 66 into zone 42 and through pipe 68, elbow 70, bore 72 into zone 44. Seal 36 and surface 28 adjacent the interior surface of side wall 14 act as a sliding valve to interrupt the flow of fuel and air into zone 42 as rotor 20 moves clockwise from the position shown in FIGURE 1. Thus, when seal 36 passes bore 66 during the clockwise motion of rotor 20, the passage of fuel and air will be interrupted when the line pressure of fuel and air equals the pressure in the space between the interior surfaces of casing 10 and the surfaces of rotor 20 between seals 36 and 38. Fuel and air will again flow when the direction of rotor reverses and seal 36 passes by bores 66 and 54. Thus the flow of fuel and air into zone 42 is controlled in a timed relationship with the oscillation of rotor 20.

Figure 2:
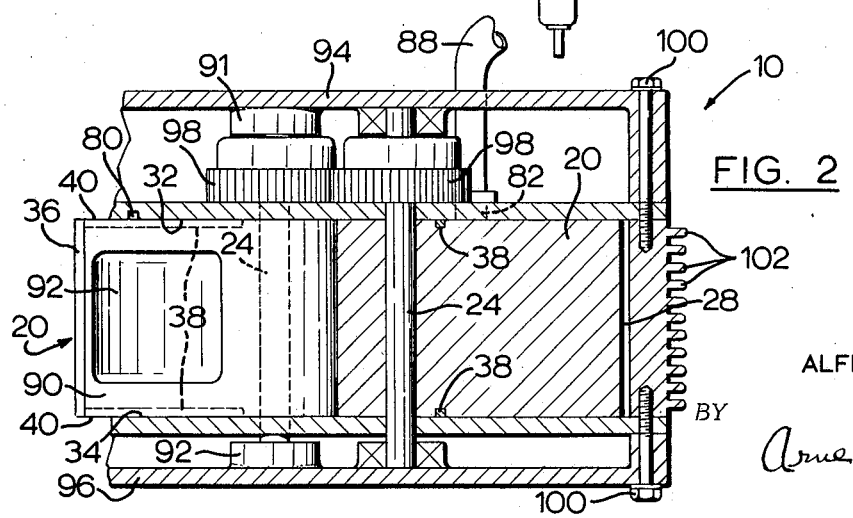
FIGURE 2 is a section of the engine taken on line 2—2 of FIGURE 1.

As seen in the cut-away portion of rotor 20 in FIGURE 1, an arcuate depression 92 is formed in surface 90 of rotor 20. Without depression 92 a substantial portion of the energy produced from the combustion of the mixture of fuel and air would be wastefully expended in urging rotors 20 apart about shafts 24. Depression 92 increases the surface of rotor 20 upon which acts the energy generated by the ignition of fuel and air and is for the purpose of directing a substantial portion of the energy from expansion of the exploding mixture against depression 92, thereby urging rotors 20 to rotate in opposite angular directions about shafts 24. As shown in FIGURE 2, depression 92 is substantially rectangular in plan.

A pair of spark plugs 76 and 78 are arranged at upper wall 16 and lower wall 18 respectively. Cut into end wall 32 is a shallow, generally semi-circular groove 80. Groove 80 is provided to allow combustion to spread from one zone to the other.

Provided in end wall 32 are ports 82 and 84 through which large amounts of exhaust gas at high pressure are expelled. Exhaust from zone 42 is expelled through port 82 until leading edge 104 of rotor 20, which is moving in a counter-clockwise direction, passes by port 82, at which time port 82 is blocked and no further exhaust may pass therethrough. Similarly, exhaust is expelled through port 84 until blocked by rotor 20. Exhaust ports 82 and 84 may also be located in upper wall 16 and lower wall 18. Hot exhaust gases may be conveyed via ports 82 and 84 and pipes 86 and 88 to a tail pipe where the thrust resulting from the reaction force of the discharge of gases may be usefully harnessed. Preferably the gases are collected in an after burner and are expelled at high velocity. The exhaust gases may also be conveyed to a turbine. The exhaust gases are capable of producing full rotation of the turbine blades. Preferably, to increase the thrust, exhaust gases should travel between equally spaced metal plates. Water sprayed onto these plates will be quickly changed to steam thereby increasing increasing the pressure of the escaping gases. In addition, the exhaust gases may be put to other analogous uses.

As seen in FIGURE 2, shaft 24 passes through apertures in end walls 32 and 34, the ends being journalled to bearings 91 and 92 respectively. Bearing 91 is attached to end plate 94 and bearing 92 is attached to end plate 96. Gears 98 are fastened to shafts 24 between bearings 91 and side wall 32 and mate to each other to ensure that rotors 20 are synchronized to oscillate in opposite angular directions with respect to each other. It will be understood that in place of gears 98, friction wheels or a clutch arrangement may be used.

Bolts 100 are provided to fasten end plates 94 and 96 to end walls 32 and 34 respectively.

Provision is made for the cooling of casing 10 when rotors 20 are oscillating by providing on the exterior surface of casing 10 a plurality of fins 102 arranged parallel to each other.

Figure 3:
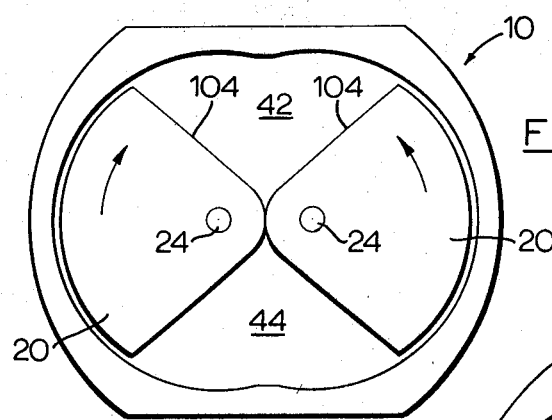
FIGURES 3 to 6 are cross sectional views of the engine showing the positions of the moving parts during one-half-cycle.
Figure 4:
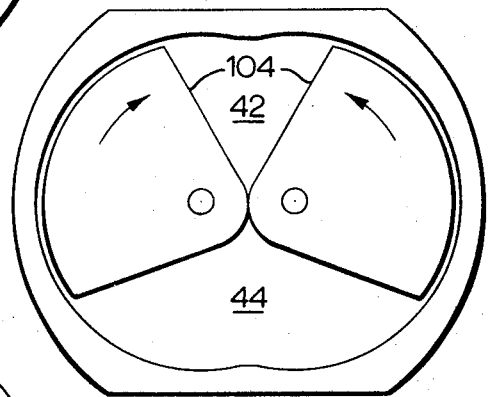
Figure 5:
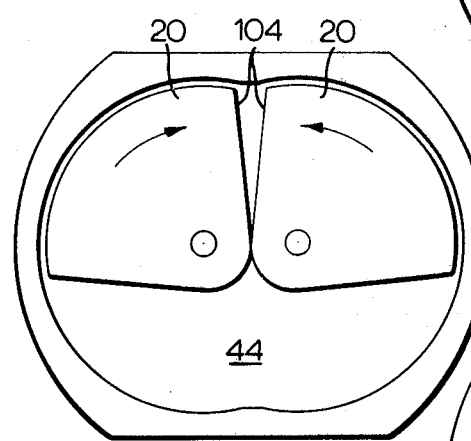
Figure 6:
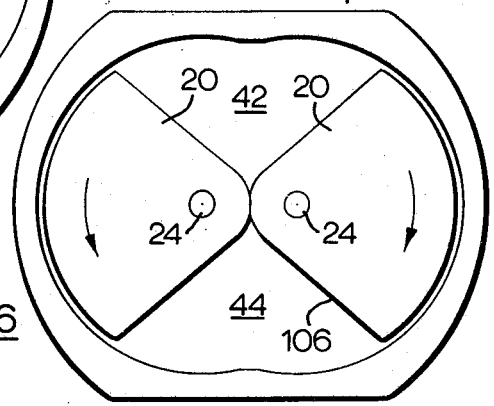

To start the engine, spark plugs 76 and 78 are energized and the fuel line is opened. Air is introduced into the combustion zones, the air introduced into one zone being of higher pressure than that of the other in order to produce a pressure difference between one zone and the other. The pressure difference must be sufficient to urge rotors 20 toward each other so that the mixture of fuel and air in one combustion zone will be ignited by the spark plug. Normally a pressure difference of approximately 30 p.s.i. is sufficient for this purpose. In FIGURE 3, ignition of the mixture of fuel and air in zone 44 produces a pressure increase and urges rotors in the direction indicated by the arrows. Fuel and air pass into zone 42 until leading edges 104 of rotor 20 pass the inlets indicated in FIGURE 4. Leading edges 104 continue to advance toward each other and the angle between edges 104 diminishes to approximately 15° as illustrated in FIGURE 5, at which time spark plug 76 ignites the mixture of fuel and air within zone 42. An extremely rapid build-up in pressure forces rotors to reverse their angular velocity and retreat from each other. As the rotors retreat, the gases generated from the previous ignition within zone 44 are driven outwardly through port 84 and pipe 88 until the leading edge 106 of one rotor blocks the further escape of gases. Large amounts of gas at high pressure are alternatively exhausted through one port, then through the other. After the rotors have completed at least three cycles, the spark plugs may be de-energized and combustible mixtures of fuel and air will be ignited by the spark carried within the groove from the previous ignition.

Figure 7:
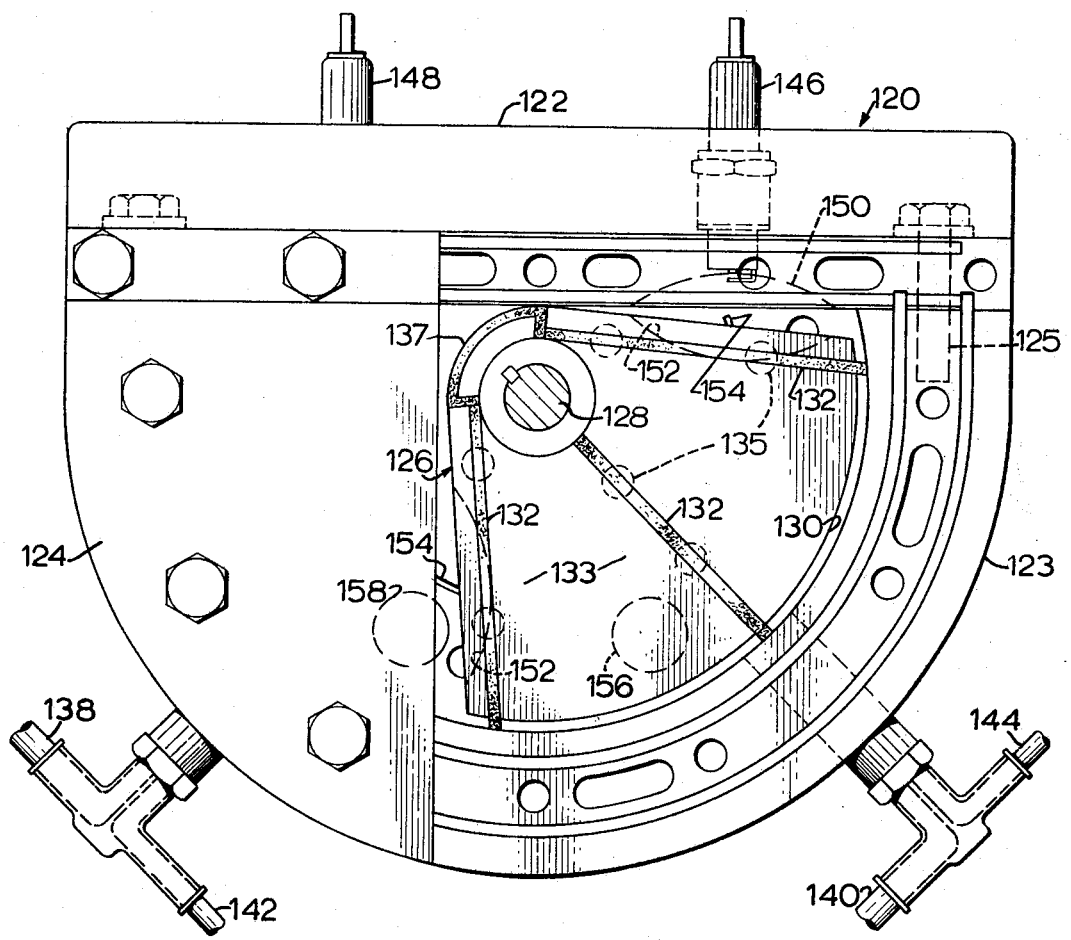
FIGURE 7 is an elevation of a second embodiment of the engine taken on line 7—7 of FIGURE 8 and in which a portion of the end wall is removed.

FIGURE 7 illustrates a second embodiment of the present invention in which power output may be obtained from an engine having a single oscillating rotor. In the engine illustrated, the casing is designated as 120 having planar wall 122, arcuate wall 123 and end wall 124. Walls 122 and 123 are bored for receipt of securing bolts (one shown and marked 125) and end wall 124 is secured to wall 123. A rotor 126 is keyed to shaft 128 for oscillation within casing 120, rotor 126 having an arcuate surface 130 having the same curvature as the interior surface of wall 123 and in proximity thereto. A pressure type seal 132 is mortised into surface 130 and faces 133 to provide a seal between surface 130 and the interior surface of wall 123 and between the interior surfaces of end walls 124 and 136 (shown in FIGURE 8) and faces 133. Seal 132 is resiliently mounted to rotor 126, being urged toward the interior surface of end walls 124 and 136 for sealing engagement therewith by resilient means in the form of helical springs (not shown) mounted within bores 135 formed in rotor 126. An additional seal 137 is formed about the apex of rotor 124 in proximity to shaft 128 and is for the purpose of confining the products of combustion within the combustion zone.

Fuel is fed into casing 120 through pipes 138 and 140 and air through pipes 142 and 144, seal 132 and wall 130 acting as a sliding valve as before.

Spark plugs 146 and 148 are secured to planar wall 122 and are arranged at opposite ends of the path of rotor 126. As shown, the spark gap of plug 146 is located at the apex of a depression 150 in wall 122. Depression 150 is substantially rectangular in plan and generally semi-circular in cross section. The spark gap of plug 148 is similarly located at the apex of a depression cut in wall 122. Depressions 152 are formed in rotor 126 identical to depressions 92 in rotors 20. Depressions 152 together with depressions 150 are provided to increase the surfaces upon which the energy of combustion may act.

A groove 154 (largely hidden by rotor 126) is formed in end wall 136 and is for the same purpose as groove 80 shown in FIGURE 1. Ports 156 and 158 are provided in end wall 160 through which exhaust gases are expelled and a plurality of parallel fins 159 are provided on the exterior surface of casing 120 for purposes of cooling.

Figure 8:
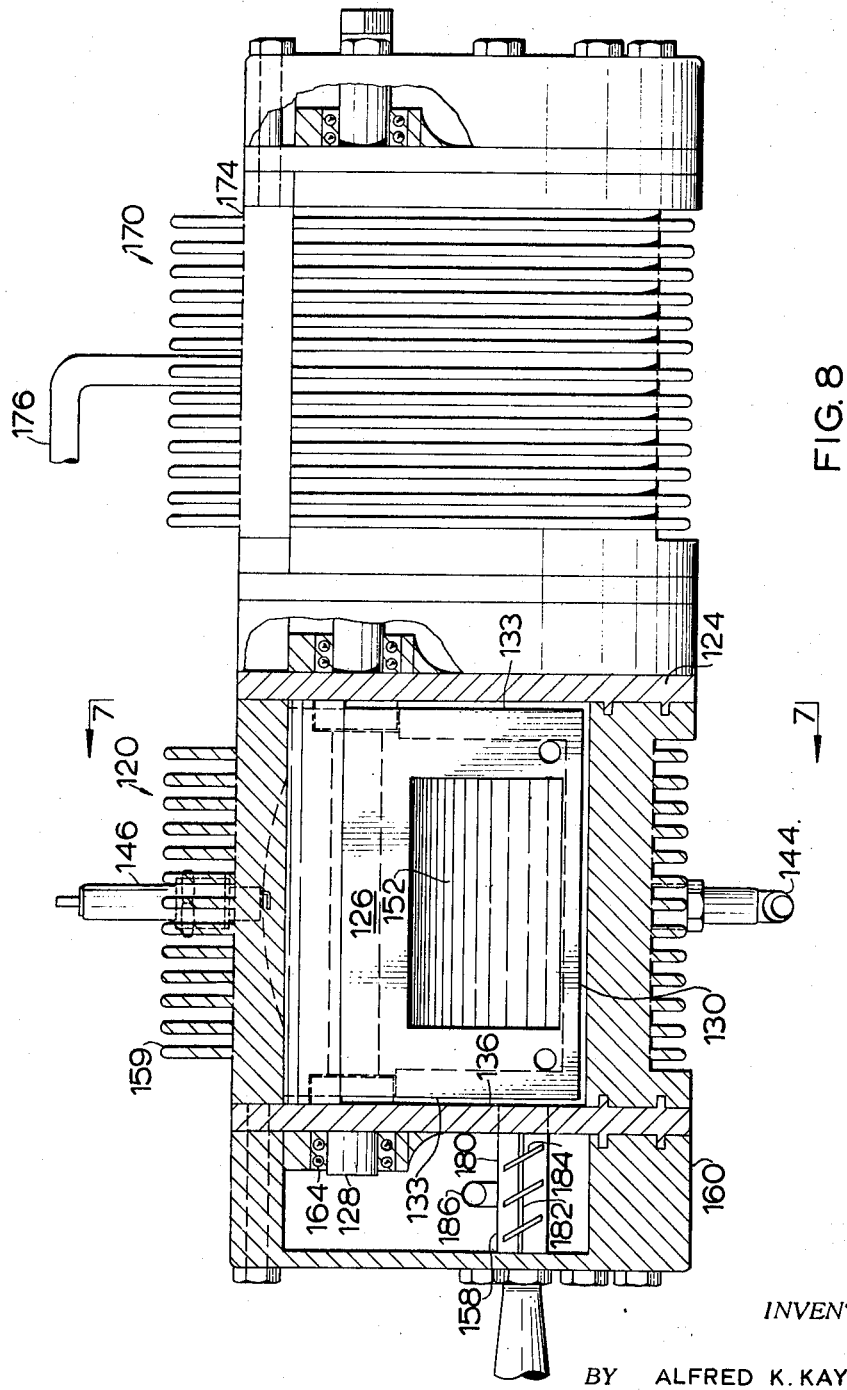
FIGURE 8 is a plan view of two casings making up the engine, an upper wall of one casing removed to expose the interior thereof.

As seen in FIGURE 8, the ends of shaft 128 are mounted in ball bearings 164 secured to end walls 124 and 133. It will be obvious that means similar to gears 98 is not appropriate for the engine.

The operation of the engine will be obvious in the light of the foregoing description of operation of the engine having a pair of oscillating rotors. As shown in FIGURE 7, rotor 126 is in the position immediately before or after ignition of the mixture of gas and air bounded by depressions 150 and 152 by spark plug 146. Such ignition will drive rotor 126 in a clockwise direction, and as rotor 126 approaches spark plug 148, exhaust from the immediately preceding combustion will be expelled through port 158 and fuel and air will be admitted into casing 120 through pipes 140 and 144. Flow of fuel and air through pipes 138 and 142 will be blocked by rotor 126 as it approaches spark plug 148. Rotor 126 will move in the opposite direction upon activation of spark plug 148 and exhaust will be expelled through port 156. Spark plugs 146 and 148 may be de-energized after at least three cycles of rotor 126 as the combustible mixtures of fuel and air will be ignited by the spark carried within groove 154.

With reference to FIGURE 8, a preferred embodiment of the present invention is illustrated in which a supply of gas under sufficient pressure to start the engine may be obtained by providing an engine composed of two casings 120 and 170 and a rotor disposed in each casing having interconnected shafts. Combustion occurs only in casing 120, casing 170 having no fuel inlet and spark plugs.

As shown, exhaust gases from casing 120 are directed through channels, one of which is shown and marked 180. Rod 182 is axially positioned within channel 180 and plates 184 are spaced along the length of rod 182 an equal length apart. Plates 184 are disposed at an angle of approximately 45° to the longitudinal axis of channel 180. Water from inlet 186 is directed onto plates 184 where it changes to steam thereby increasing the pressure of the exhaust gases.

Compressed gas produced by the rotors within casing 170 is directed through a pair of ports in wall 174 in locations corresponding to the locations of spark plugs 146 and 148 of casing 120. From the ports in wall 174 the compressed air is directed through a pair of pipes (only one shown and marked 176) into a pressure tank. A check valve maintains the pressure of the air within the tank at a predetermined level, preferably 60 p.s.i. and excess compressed air is employed to cool casings 120 and 170 during operation. Air under sufficient pressure to start the engine may therefore be introduced from the pressure tank into casing 120. Thus, there is no necessity to have an external source of compressed air in order to start the engine. It is obvious that two casings each in which a pair of rotors are mounted may be similarly connected to provide the same advantage of self starting.

The engine may be constructed of any material capable of withstanding high temperatures and pressures. Preferably, to achieve lightness aluminum is used. Volatile hydrocarbons including gasoline and diesel are suitable fuels although ammonia, hydrogen oxygen may also be used. The engine may also work on a diesel principle wherein the mixture of fuel and air is exploded by the heat generated during compression. In this case, of course, spark plugs will not be required.

Lubrication of the engine is extremely simple. The addition of approximately 3% by volume of oil to standard octane fuel provides the necessary lubrication to ensure smooth operation.

What I claim as new and desire to protect by Letters Patent of the United States is:

1. An engine producing power output in the form of jet propulsion comprising a casing having end walls, a rotor defining with the interior surfaces of said casing two combustion zones, said rotor mounted for oscillation within said casing and being in sealing sliding engagement with the interior surfaces of said casing, means for controlling the flow of fuel and air into said combustion zones in timed relationship with the oscillation of said rotor, means for igniting said fuel and air within said combustion zones and at least one exhaust port from said combustion zone producing power output in the form of jet propulsion, at least one of said rotors and said end walls having a groove extending from one said combustion zone to the other said combustion zone.

2. An engine producing power output in the form of jet propulsion comprising a casing having end walls, a pair of rotors defining with the interior surfaces of said casing two combustion zones, said rotors mounted for oscillation within said casing and being in sealing sliding engagement with the interior surfaces of said casing, means for synchronizing said rotors to oscillate in opposite angular directions with respect to each other, means for controlling the flow of fuel and air into said combustion zones in timed relationship with the oscillation of said rotors, means for igniting said fuel and air within said combustion zones and at least one exhaust port from said combustion zone producing power output in the form of jet propulsion, at least one of said rotors and said end walls having a groove extending from one said combustion zone to the other said combustion zone.

3. An engine as claimed in claim 1 wherein fuel and air are fed through apertures in the walls of said casing into each of said combustion zones, said rotor interrupting the flow of fuel and air to said combustion zones when blocking said apertures, thereby controlling the flow of fuel and air into said combustion zones in timed relationship with the oscillation of said rotor.

4. An engine as claimed in claim 2 wherein fuel and air are fed through apertures in the walls of said casing into each of said combustion zones, at least one of said rotors interrupting the flow of fuel and air to said combustion zones when blocking said apertures, thereby controlling the flow of fuel and air into said combustion zones in timed relationship with the oscillation of said rotors.

5. An engine as claimed in claim 2 wherein arcuate depressions are formed in the surfaces of said rotors which are in proximity to each other before combustion.

6. An engine as claimed in claim 1 wherein two exhaust ports are positioned in one end wall of said casing, the exhaust from one said combustion zone being expelled through one said port and the exhaust from the other said combustion zone being expelled through the other port.

7. An engine producing power output in the form of jet propulsion comprising at least two casings, each casing having end walls, a rotor mounted for oscillation within each said casing, at least one said rotor driving and at least one said rotor being driven, said driving rotor defining with the interior surfaces of said casing two combustion zones, said rotors within each said casings being interconnected by means of a shaft, said rotors being in sealing sliding engagement with the interior surfaces of said casings, means for controlling the flow of fuel and air into said combustion zones in timed relationship with the oscillation of said rotors, mean for igniting said fuel and air within said combustion zones, at least one of said driving rotor and said end walls adjacent thereto having a groove extending from one said combustion zone to the other said combustion zone, at least one exhaust port from said combustion zones producing power output in the form of jet propulsion, at least one port from said casing having a driven rotor producing compressed air, means for storing said compressed air and means for directing said compressed air into one of said compression zones to start said engine.

8. An engine producing power output in the form of jet propulsion comprising a casing having end walls, a pair of rotors defining with the interior surfaces of said casing two combustion zones, at least one of said rotors and said end walls having a groove extending from one said combustion zone to the other said combustion zone, said rotors mounted for oscillation within said casing and being in sealing sliding engagement with the interior surfaces of said casing, said rotors having arcuate depressions formed in the surfaces which are in proximity to each other before combustion, means for synchronizing said rotors to oscillate in opposite angular directions with respect to each other, means for controlling the flow of fuel and air into said combustion zones in timed relationship with the oscillation of said rotors, said fuel and air being fed through apertures in the walls of said casing into each of said combustion zones, at least one of said rotors interrupting the flow of fuel and air to said combustion zones when blocking said apertures, thereby controlling the flow of fuel and air into said combustion zones in timed relationship with the oscillation of said rotors, means for igniting said fuel and air within said combustion zones and two exhaust ports positioned in one end wall of said casing, the exhaust from one said combustion zone being expelled through one said port and the exhaust from the other said combustion zone being expelled through the other port.

References Cited

UNITED STATES PATENTS

| | | | |
|---|---|---|---|
| 970,153 | 9/1910 | Winand | 123—65 |
| 1,001,782 | 8/1911 | Steglat | 123—65 |
| 1,189,834 | 7/1916 | Kress | 123—18 |
| 1,312,387 | 8/1919 | Connolly | 123—59 |
| 2,257,884 | 10/1941 | Mize. | |
| 3,181,513 | 5/1965 | Young. | |
| 3,188,805 | 6/1965 | Gahagan. | |
| 3,301,228 | 1/1967 | Winans. | |
| 3,338,137 | 8/1967 | James | 123—18 |
| 3,388,693 | 6/1968 | James | 123—18 |

FOREIGN PATENTS 619,995  3/1949  Great Britain.

MARK M. NEWMAN, Primary Examiner

D. HART, Assistant Examiner

U.S. Cl. X.R.

60—39.76; 123—18, 59, 65